US011501273B2

(12) United States Patent
Freudman et al.

(10) Patent No.: US 11,501,273 B2
(45) Date of Patent: Nov. 15, 2022

(54) TRANSACTION PROCESSING SYSTEM

(71) Applicant: QuotePro Kiosk, LLC, Chicago, IL (US)

(72) Inventors: Marco Andres Freudman, Chicago, IL (US); Kyle Evan Blair, Westmont, IL (US)

(73) Assignee: QUOTEPRO KIOSK, LLC, Chicago, IL (US)

( * ) Notice: Subject to any disclaimer, the term of this patent is extended or adjusted under 35 U.S.C. 154(b) by 0 days.

(21) Appl. No.: 17/003,691

(22) Filed: Aug. 26, 2020

(65) Prior Publication Data

US 2020/0394629 A1    Dec. 17, 2020

Related U.S. Application Data

(63) Continuation-in-part of application No. 16/039,119, filed on Jul. 18, 2018, now abandoned.
(Continued)

(51) Int. Cl.
*G06Q 20/18* (2012.01)
*G06Q 20/20* (2012.01)
*G06Q 20/40* (2012.01)

(52) U.S. Cl.
CPC ........... *G06Q 20/18* (2013.01); *G06Q 20/209* (2013.01); *G06Q 20/4014* (2013.01)

(58) Field of Classification Search
CPC ... G06Q 20/18; G06Q 20/209; G06Q 20/4014
(Continued)

(56) References Cited

U.S. PATENT DOCUMENTS

| 5,604,341 A | 2/1997 | Grossi et al. |
| 5,940,811 A | 8/1999 | Norris |

(Continued)

FOREIGN PATENT DOCUMENTS

JP    WO1996024105 A1 *  8/1996

OTHER PUBLICATIONS

Y. Shah, V. Choyi and L. Subramanian, "Multi-factor Authentication as a Service," 2015 3rd IEEE International Conference on Mobile Cloud Computing, Services, and Engineering, 2015, pp. 144-150, doi: 10.1109/MobileCloud.2015.35. (Year: 2015).*

*Primary Examiner* — Hani M Kazimi
*Assistant Examiner* — Alison L. Lamb
(74) *Attorney, Agent, or Firm* — Crowell & Moring LLP (57) ABSTRACT

A method for processing a transaction includes receiving, at a terminal and from a user, a selection of a service provider; receiving authentication credential requirements associated with the selected service provider that facilitate authentication of the user by the service provider; and communicating, to the service provider account server, authentication credentials associated with the user that satisfy the authentication credential requirements. When the user is authenticated, the method includes receiving, from the service provider account server, information indicative of an amount owed on an account with the service provider that is associated with the user. The method further includes receiving, via currency processing hardware of the terminal, currency; and communicating transaction information to the service provider account server that indicates an amount of currency received by the terminal to thereby reduce the amount owed on the account by the user. When an amount of currency received by the terminal exceeds and amount owed on the account, the method includes providing, by the terminal, an amount of currency that corresponds to a difference between the
(Continued)

amount of currency received and the amount owed on the account.

20 Claims, 6 Drawing Sheets

Related U.S. Application Data (60) Provisional application No. 62/576,043, filed on Oct. 23, 2017.

(58) Field of Classification Search
USPC .......................................................... 705/40
See application file for complete search history.

(56) References Cited

U.S. PATENT DOCUMENTS

| | | | |
|---|---|---|---|
| 6,021,400 A | 2/2000 | Gallacher et al. | |
| 6,105,007 A | 8/2000 | Norris | |
| 6,771,766 B1 | 8/2004 | Shafiee et al. | |
| 7,062,465 B1 | 6/2006 | Shafiee et al. | |
| 7,296,002 B2 | 11/2007 | Shafiee et al. | |
| 8,135,126 B2 | 3/2012 | Shafiee et al. | |
| 8,572,083 B1 | 10/2013 | Snell et al. | |
| 8,762,376 B2 | 6/2014 | Snell et al. | |
| 8,842,156 B1 | 9/2014 | Alekhin | |
| 9,082,151 B2 | 7/2015 | Snell et al. | |
| 2003/0191714 A1 | 10/2003 | Norris | |
| 2005/0038737 A1 | 2/2005 | Norris | |
| 2006/0036501 A1* | 2/2006 | Shahbazi | G07F 19/203 705/16 |
| 2006/0282660 A1* | 12/2006 | Varghese | G06Q 20/4016 713/155 |
| 2013/0346302 A1* | 12/2013 | Purves | G06Q 20/102 705/40 |
| 2014/0136351 A1 | 5/2014 | Lennon | |
| 2015/0178701 A1* | 6/2015 | Glass | G06Q 30/0226 705/14.27 |
| 2017/0374070 A1* | 12/2017 | Shah | H04L 63/0884 |

* cited by examiner

```xml
<Deposit CaptureNumber="0261" TransactionDate="2017-09-18T01:23:11" TransactionReferenceId="1589708" DeviceReferenceId="MCMCDEALER1">
  <Description>111.00 deposited into MCMCDEALER1 for Loan 1589708</Description>
  <Denominations>
    <Denom DenomReferenceId="1000" CurrencyReferenceId="USD">
      <NumberOfItems>1</NumberOfItems>
      <TransactionAmount>10.00</TransactionAmount>
    </Denom>
    <Denom DenomReferenceId="1000" CurrencyReferenceId="USD">
      <NumberOfItems>1</NumberOfItems>
      <TransactionAmount>10.00</TransactionAmount>
    </Denom>
    <Denom DenomReferenceId="500" CurrencyReferenceId="USD">
      <NumberOfItems>1</NumberOfItems>
      <TransactionAmount>5.00</TransactionAmount>
    </Denom>
    <Denom DenomReferenceId="500" CurrencyReferenceId="USD">
      <NumberOfItems>1</NumberOfItems>
      <TransactionAmount>5.00</TransactionAmount>
    </Denom>
    <Denom DenomReferenceId="2000" CurrencyReferenceId="USD">
      <NumberOfItems>1</NumberOfItems>
      <TransactionAmount>20.00</TransactionAmount>
    </Denom>
    <Denom DenomReferenceId="2000" CurrencyReferenceId="USD">
      <NumberOfItems>1</NumberOfItems>
      <TransactionAmount>20.00</TransactionAmount>
    </Denom>
    <Denom DenomReferenceId="2000" CurrencyReferenceId="USD">
      <NumberOfItems>1</NumberOfItems>
      <TransactionAmount>20.00</TransactionAmount>
    </Denom>
    <Denom DenomReferenceId="2000" CurrencyReferenceId="USD">
      <NumberOfItems>1</NumberOfItems>
      <TransactionAmount>20.00</TransactionAmount>
    </Denom>
    <Denom DenomReferenceId="100" CurrencyReferenceId="USD">
      <NumberOfItems>1</NumberOfItems>
      <TransactionAmount>1.00</TransactionAmount>
    </Denom>
  </Denominations>
  <CashierCashierName="KIOSK" CashierId="MCMCDEALER1"/>
  <Register RegisterName="KIOSK" RegisterId="MCMCDEALER1"/>
  <ShiftShiftNumber="S2"/>
  <DepSourceSourceId="501" SourceType="Acceptor"/>
</Deposit>
```

Fig. 3A

```xml
<Withdrawal DayNumber="D261" TransactionDate="2017-09-18T01:19:05" TransactionReferenceId="148589KK" DeviceReferenceId="MCMDEALER1">
  <Description>NoteDispenser</Description>
  <Denominations>
    - <Denom DenomReferenceId="1000" CurrencyReferenceId="USD">
        <NumberOfItems>1</NumberOfItems>
        <TransactionAmount>10.00</TransactionAmount>
      </Denom>
  </Denominations>
  <Cashier CashierName="KIOSK" CashierId="MCMDEALER1"/>
  <Register RegisterName="KIOSK" RegisterId="MCMDEALER1"/>
  <InputSource SourceId="d01" SourceType="Change"/>
</Withdrawal>
<Deposit DayNumber="D261" TransactionDate="2017-09-18T01:19:05" TransactionReferenceId="148589KK" DeviceReferenceId="MCMDEALER1">
  <Description>50.00 deposited into MCMDEALER1 for Loan 148589KK</Description>
  <Denominations>
    - <Denom DenomReferenceId="2000" CurrencyReferenceId="USD">
        <NumberOfItems>1</NumberOfItems>
        <TransactionAmount>20.00</TransactionAmount>
      </Denom>
    - <Denom DenomReferenceId="2000" CurrencyReferenceId="USD">
        <NumberOfItems>1</NumberOfItems>
        <TransactionAmount>20.00</TransactionAmount>
      </Denom>
    - <Denom DenomReferenceId="2000" CurrencyReferenceId="USD">
        <NumberOfItems>1</NumberOfItems>
        <TransactionAmount>20.00</TransactionAmount>
      </Denom>
  </Denominations>
  <Cashier CashierName="KIOSK" CashierId="MCMDEALER1"/>
  <Register RegisterName="KIOSK" RegisterId="MCMDEALER1"/>
  <Shift ShiftNumber="S2"/>
  <InputSource SourceId="S01" SourceType="Acceptor"/>
</Deposit>
```

Fig. 3B

```xml
<Withdrawal DayNumber="D261" TransactionDate="2017-09-18T11:06:34" TransactionReferenceId="6957340" DeviceReferenceId="MCMCDEALER1">
  <Description>NoteDispenser</Description>
  <Denominations>
    <Denom DenomReferenceId="2000" CurrencyReferenceId="USD">
      <NumberOfItems>1</NumberOfItems>
      <TransactionAmount>20.00</TransactionAmount>
    </Denom>
    <Denom DenomReferenceId="2000" CurrencyReferenceId="USD">
      <NumberOfItems>1</NumberOfItems>
      <TransactionAmount>20.00</TransactionAmount>
    </Denom>
  </Denominations>
  <Cashier CashierName="KIOSK" CashierId="MCMCDEALER1"/>
  <Register RegisterName="KIOSK" RegisterId="MCMCDEALER1"/>
  <InputSource SourceId="802" SourceType="Change"/>
</Withdrawal>
<Deposit DayNumber="D261" TransactionDate="2017-09-18T11:06:34" TransactionReferenceId="6957340" DeviceReferenceId="MCMCDEALER1">
  <Description>260.00 deposited into MCMCDEALER1 for BILL PAY COMED</Description>
  <Denominations>
    <Denom DenomReferenceId="10000" CurrencyReferenceId="USD">
      <NumberOfItems>1</NumberOfItems>
      <TransactionAmount>100.00</TransactionAmount>
    </Denom>
    <Denom DenomReferenceId="10000" CurrencyReferenceId="USD">
      <NumberOfItems>1</NumberOfItems>
      <TransactionAmount>100.00</TransactionAmount>
    </Denom>
    <Denom DenomReferenceId="10000" CurrencyReferenceId="USD">
      <NumberOfItems>1</NumberOfItems>
      <TransactionAmount>100.00</TransactionAmount>
    </Denom>
  </Denominations>
  <Cashier CashierName="KIOSK" CashierId="MCMCDEALER1"/>
  <Register RegisterName="KIOSK" RegisterId="MCMCDEALER1"/>
  <ShiftSlotNumber>S2</ShiftSlotNumber>
  <InputSource SourceId="502" SourceType="Acceptor"/>
</Deposit>
```

TRANSACTION PROCESSING SYSTEM

PRIORITY

This application is a continuation-in-part of and claims priority to U.S. patent application Ser. No. 16/039,119, filed Jul. 18, 2018, and entitled TRANSACTION PROCESSING SYSTEM, the contents of which are hereby incorporated in their entirety. U.S. patent application Ser. No. 16/039,119 claims priority to U.S. Provisional Patent Application No. 62/576,043, filed Oct. 23, 2017, the contents of which are hereby incorporated in their entirety.

FIELD

This application generally relates to computer accounting systems. In particular, this application describes a transaction processing system.

BACKGROUND

Service providers such as utility services, loan services, retail establishment services, government agencies, etc. typically send out bills for services rendered on a periodic basis. Many customers pay the bills by sending a check to the service provider. In some cases, customers direct their bank to transfer funds electronically to the service provider. In other cases, the service provider is authorized ahead of time by the customer to draw funds directly from the customer's account.

The process of paying bills is relatively straight forward for those customers having bank accounts and means for electronically viewing account information and for electronically transferring funds.

For those customers lacking these means, the process is more burdensome. For example, a customer without a bank account may have to resort to paying bills with cash or by money order. Not only is this burdensome, but this results in transaction processing delays, which may result in late or missed payments This and other problems will become apparent upon reading the description below.

SUMMARY

In a first aspect, a terminal for processing transactions includes a user interface configured to convey information to a user and to receive user commands; currency processing hardware configured to receive currency from the user and to determine a type of currency accepted; a processor in communication with the user interface and the currency processing hardware; and non-transitory computer readable media in communication with the processor that stores instruction code executable by the processor. When executed by the processor, the instruction code causes the processor to receive, via the user interface, an account category selection and communicate the account category selection to a back-end server. The processor then receives, from the back-end server, a listing of service providers associated with the account category selection and conveys on the user interface the listing. The processor receives, via the user interface, a service provider selection and communicates the selection to a back-end server. The processor then receives, from the back-end server, authentication requirements associated with an account server that is associated with the service provider selection, and conveys controls on the user interface that facilitate specification of the authentication requirements by the user. The processor communicates specified requirements to the back-end server. In response, the back-end server communicates the specified requirements to the account server and the account server communicates a listing of one or more services provided by the account server to the back-end server. The processor receives the listing of services provided by the account server from the back-end server and receives, via the user interface, a service selection. The processor then communicates the service selection to the back-end server. In response, the back-end server communicates the service selection to the account server and the account server communicates service information associated with the service selection to the back-end server. The processor receives the service selection from the back-end server. The processor then receives, via the interface, an indication of an amount of currency to be paid and receives currency via the currency processing hardware. The processor then communicates the amount of currency received to the back-end server. In response, the back-end server communicates and indication of the amount of currency received to the account server.

In a second aspect, a method for processing a transaction includes receiving, at a terminal and from a user, a selection of a service provider; receiving authentication credential requirements associated with the selected service provider that facilitate authentication of the user by the service provider; and communicating, to the service provider account server, authentication credentials associated with the user that satisfy the authentication credential requirements. When the user is authenticated, the method includes receiving, from the service provider account server, information indicative of an amount owed on an account with the service provider that is associated with the user. The method further includes receiving, via currency processing hardware of the terminal, currency; and communicating transaction information to the service provider account server that indicates an amount of currency received by the terminal to thereby reduce the amount owed on the account by the user. When an amount of currency received by the terminal exceeds and amount owed on the account, the method includes providing, by the terminal, an amount of currency that corresponds to a difference between the amount of currency received and the amount owed on the account.

In a third aspect, a non-transitory computer readable medium that includes instruction code for processing a transaction is provided. The instruction code is executable on a machine for causing the machine to perform acts that include receiving, from a user, a selection of a service provider; receiving authentication credential requirements associated with the selected service provider that facilitate authentication of the user by the service provider; and communicating, to the service provider account server, authentication credentials associated with the user that satisfy the authentication credential requirements. When the user is authenticated, the machine receives, from the service provider account server, information indicative of an amount owed on an account with the service provider that is associated with the user; receives, via currency processing hardware of the machine, currency; and communicates transaction information to the service provider account server that indicates an amount of currency received by the machine to thereby reduce the amount owed on the account by the user. When an amount of currency received by the machine exceeds and amount owed on the account, the machine provides an amount of currency that corresponds to a difference between the amount of currency received and the amount owed on the account.

BRIEF DESCRIPTION OF THE DRAWINGS

FIGS. 3A-3C illustrate exemplary transaction information generated by the transaction processing system.

DETAILED DESCRIPTION

A system for processing transactions is described below. The system includes a kiosk through which a customer interacts. The kiosk communicates with a back-end-server, which in turn receives information from account servers of customer service providers to obtain customer account information, such as balances, due dates, etc. The customer is able to pay down the accounts through the kiosk and receive change from the kiosk.

Figure 1:
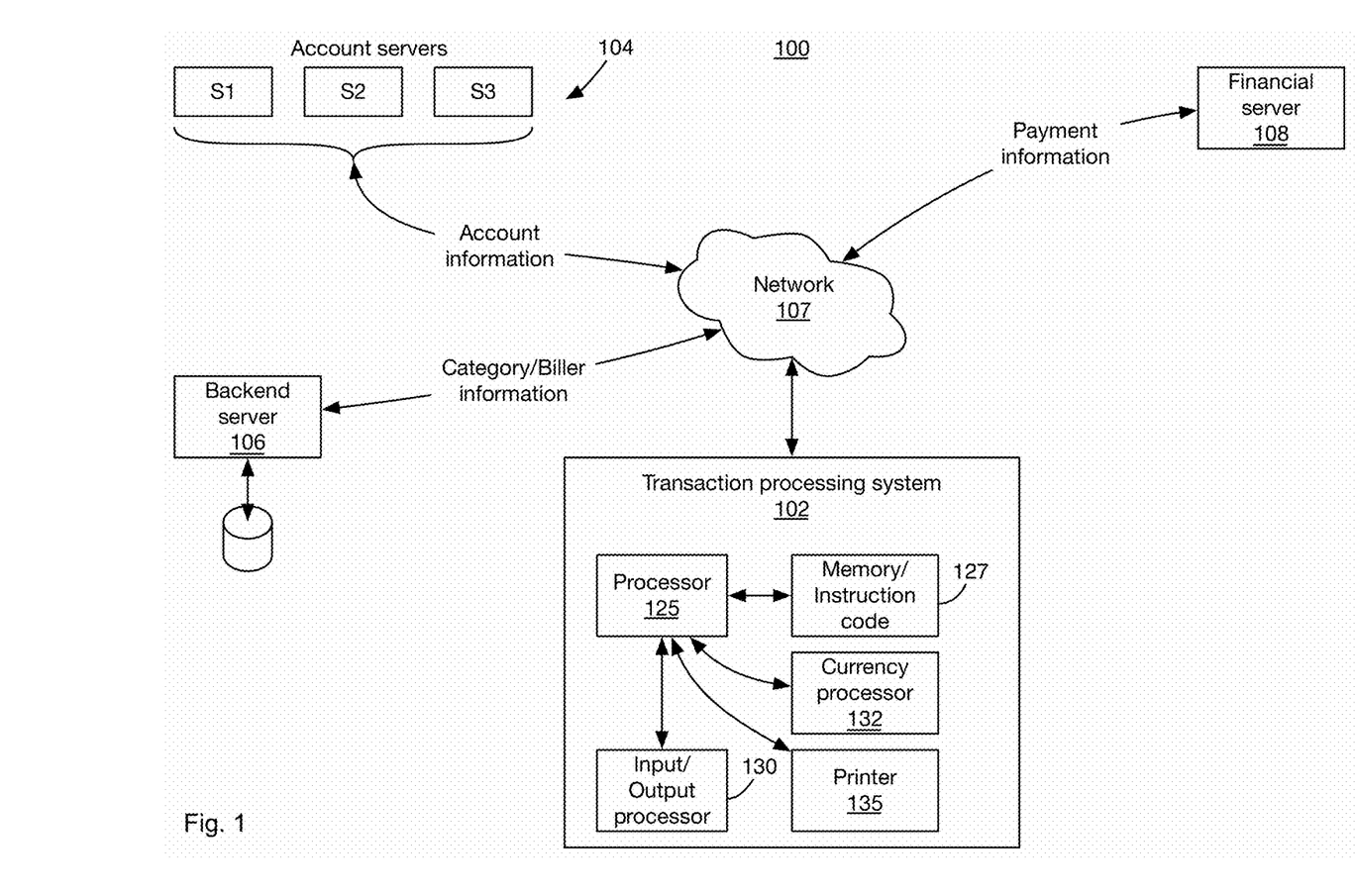
FIG. 1 illustrates an exemplary environment that includes a transaction processing system that facilitate processing transactions.

FIG. 1 illustrates an exemplary environment 100 that includes various systems/devices that facilitate processing transactions, such as bill payment transactions. The systems/devices may be owned, jointly owned and/or operated by organizations, such as corporations, government agencies, institutions, individuals, etc.

Exemplary systems/devices of the environment 100 include a transaction processing system 102, an exemplary group of account servers 104 associated with related service providers, a back-end server 106, and a financial server 108. The various systems and servers may communicate with one another via a network 107, such as the Internet.

The account servers 104, back-end server 106, and financial server 108 may correspond to computer systems such as an Intel®, AMD®, or PowerPC® based computer system or a different computer system and can include application specific computer systems. The computer systems may include an operating system, such as Microsoft Windows®, Linux, Unix® or other operating system. The servers may include one or more API's that facilitate communicating information to and from the respective severs. For example, the API may correspond to a web services API, RESTful API, SOAP API, and/or a different API.

The account servers 104 correspond to systems for managing billing accounts associated with a service provider. For example, a utility company may have an account server that facilitates viewing information such as a bill, account balance, etc. The account server 104 may also facilitate paying a bill and/or marking a bill as having been paid.

The number of account servers 104 illustrated is merely exemplary. It is understood that there may be any number of billing servers, the number corresponding to the number of services and/or service providers for which transactions may be processed. For example, the account servers 104 may include any number of account servers associated with servicer providers such as utility services, loan services, retail establishment services, government agencies, etc.

The financial server 108 may correspond to a system that facilitates routing payments received via the transaction processing system 102 to a corresponding service provider. In one implementation the financial server 108 is managed by an organization that provides services to leasing and finance companies, banks, credit unions, etc., and the financial server 108 provides account-to-account transfer applications to facilitate routing currency between parties.

The back-end server 106 stores information specific to the various account servers. For example, the back-end server 106 may include databases that includes one or more records, where each record may be related to a given account server and/or service provider that owns/operates the account server. Table 1 below illustrates an exemplary set of records that may be stored in the database.

TABLE 1

| Service provider | Category | Server IP address | Capabilities | Authentication Requirements |
| --- | --- | --- | --- | --- |
| Electric Co. | Utility | 111.222.333.444 | Lookup | Two or more of: Name on account, zip code for account holder, SSN of account holder |
| Gas Co. | Utility | 222.111.333.444 | Blind push | Name, Account Number, and Amount |
| . . . | . . . | . . . | . . . | . . . |

Referring to Table 1, a first record associated with a service provider may specify the name of the service provider, the IP address for the account server associated with the service provider, capabilities, and requirements associated with the account server. The capabilities field indicates the capabilities of the account server. For example, a server with lookup capabilities may be capable of providing account information, such as a current balance, and amount owed for the current billing cycle, etc. A server with blind push capabilities may be unable to provide such information.

The authentication requirements field indicates the information needed by the account server to authenticate and process information. For example, a first account server may require two items of information to facilitate access to information provided by the account server, such as the name on account, zip code and/or SSN of account holder. This type of server may be less cumbersome to deal with in that the information required may be relatively easy to remember. On the other hand, the second server may require the name on the account along with the account number, and an amount to be paid.

The transaction processing system (TPS) 102 may correspond to a terminal device such as a kiosk that may be located in a business establishment, such as a bank, car dealer, or elsewhere. The TPS 102 includes a processor 125, a non-transitory computer readable medium 127 that stores instruction code executed by the processor 125. The TPS 102 also includes various subsystems such as an input/output (I/O) processor 130, currency processing hardware 132, and a printer 135.

The I/O processor 130 is configured to facilitate communications with entities outside of the TPS 102. In this regard, the I/O processor 110 may be configured to dynamically determine the communication methodology utilized by entities of the environment 100 for communicating information to the entities using the determined communication methodology. For example, the I/O processor 110 may determine that a first entity utilizes a RESTful API and may, therefore, communicate with the entity using a RESTful communication methodology. As described in more detail below, the I/O processor 110 may generate one or more interfaces through which users may interact with the TPS 102.

The currency processing hardware 132 corresponds to a device capable of receiving currency, determine the value of the currency, and optionally providing change. For example, the currency processing hardware 132 may include a slot through which currency is inserted. The currency processing hardware 132 may include a scanning system to analyze the currency for determining the value of the currency. Bank notes of different face values may be stored within the currency processing hardware 132 to facilitate providing change.

The printer 135 corresponds to any device capable of producing a print out. In this regarding the printer 135, may correspond to a dot matrix printer, thermal printer, inkjet printer, etc. The printer 135 may be operable to print a receipt, a current balance, and other information that may be requested by a user.

The processor 125 executes instruction code stored in a memory device 127 for coordinating activities performed between the various subsystems. The processor 125 may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system.

Figure 2:
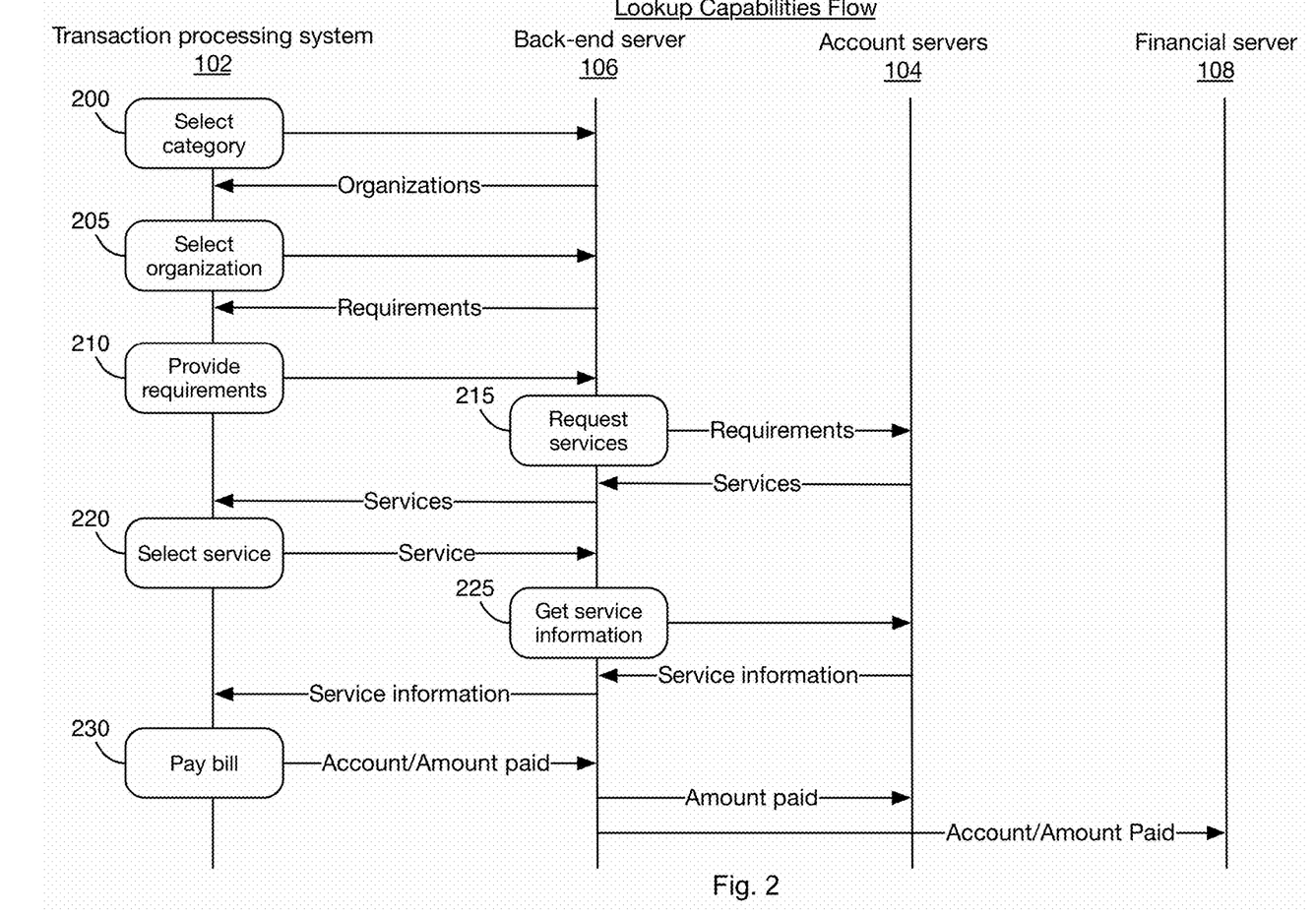
FIG. 2 illustrates an exemplary flow diagram associated with the exemplary environment.

Exemplary operations performed by one or more of the subsystems of the TPS 102 in processing a transaction are illustrated in FIG. 2. In this regard, the operations may be implemented via instruction code stored in non-transitory computer readable media 127 that resides within the TPS 102, one or more of the subsystems of the TPS 102, and one or more of the entities of the environment 100 configured to cause the respective subsystems/entity to perform the operations illustrated in the figures and discussed herein.

At block 200, a user of the TPS 102 may, via an interfaces generated by the I/O subsystem 110, select billing category. In this regard, the TPS 102 may have been previously supplied with a list of common billing categories, such as Utilities, Retail Merchandising, Bank, Car Dealers, Grocery, etc. The user may select for example the utility category. The selected category may be communicated to the back-end server. The back-end server 106 may respond with a list of organizations that belong to the selected category. For example, in the case of utilities, the back-end server 106 may response with the organizations Electric Co. and Gas Col.

At block 205, the organizations may be presented to the user via an interface. The user may then select and organization for which account information is desired. The selected organization may then be communicated to the back-end server 106.

The back-end server 106 may determine authentication requirements associated with the selected account server 104 that are in turn associated with the selected service provider. For example, in the case of Electric Co., the back-end server 106 may determine that two or more of the name on account, zip code for account holder, and SSN of account holder are required. The requirements may be communicated to the TPS 102.

At block 210, the TPS 102 may dynamically generate an interface based on the requirements for authenticating with the account server 104. For example, the TPS 102 may display an interface with input fields for providing the requirements. The interface may display an instruction such as "Please enter two or more of the following items." The user may then specify as many required items as needed. The specified items may then be communicated to the back-end server 105.

At block 215, the back-end server 106 may subsequently determine that the required fields have been provided. If the required fields have been provided, the back-end server 106 may communicate the requirements to the account sever via one of the account server APIs. The account server 104 may then determine whether the requirements match any accounts on the account server 104, and if so, communicate a list of services provided by the account server 104. For example, the services may include checking an account balance, paying an account, and/or other services. The back-end server 106 may communicate a listing of the services to the TPS 102.

If the requirements do not match any accounts, the account server 104 may indicate this fact to the back-end server 106, which may in turn communicate this fact to the TPS 102. The TPS 102 may present an error message to the user in this case.

At block 220, the user may select a service, such as "Pay Bill." The selection may be communicated to the back-end server 106.

At block 225, the back-end server 106 may request information related to the selected services from the account server 104. The requested service information may be communicated to the back-end server 106, which may then communicate the information to the TPS 102. For example, service information associated with a bill paying service may include the account balance, an amount due, the due date for paying the amount, previous transactions, etc.

At block 230, the user may elect to pay the amount due. For example, the amount due may be $75. In this case, the user may specify the amount to pay via an interface of the TPS 102. In addition or alternatively, the user may insert a corresponding amount of currency into the currency processing hardware 132 of the TPS 102. The TPS 102 may confirm that an adequate amount of currency has been inserted 132. Where excess funds have been provided, the TPS 102 may provide the user with change.

Once the TPS 102 determines that enough funds have been received, the TPS 102 may communicate and indication to back-end server that the amount of currency specified by the user has been deposited. The back-end server may forward this information to the account server, which may then mark the bill as having been paid, or may deduct the amount paid from the current balance.

The back-end server 106 may also communicate this information to the financial server 108 along with information that specifies the organization, the account number for which funds have been received, etc. The financial server 108 may then transfer funds at a later time to the organization.

Exemplary transaction information that may be communicated by the TPS 102 during the operations described above is illustrated in FIGS. 3A-3B. The exemplary transactions are represented in an XML format. However, it is understood that the transaction information may be formatted differently (e.g., binary, JSON, text, etc.).

Figure 3A:
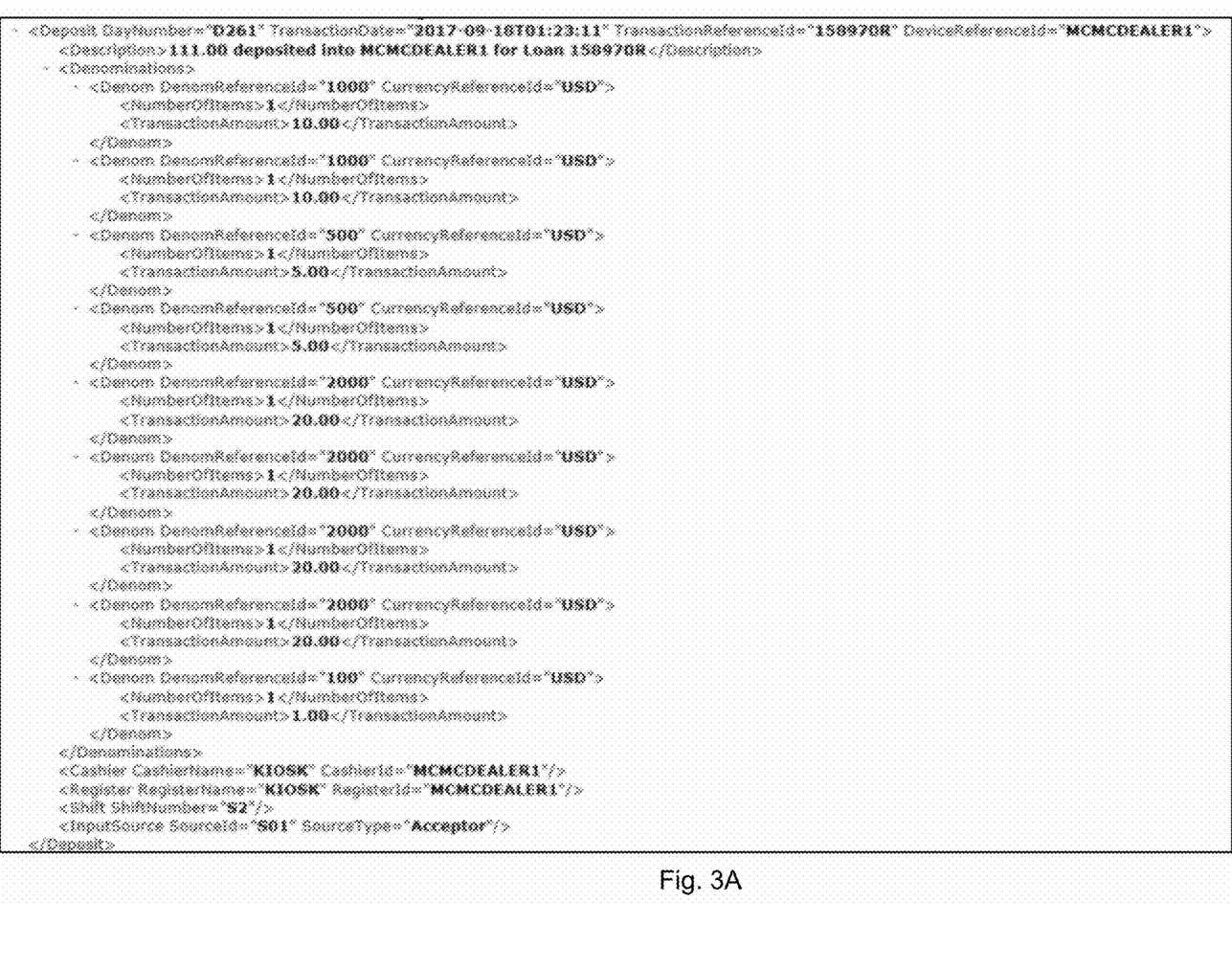

The first exemplary transaction of FIG. 3A may be generated under the following scenario: A customer may select a biller to be paid at operation 205. The customer may have previously provided identifying information at operation 210. Service information communicated to the customer after operation 225 may indicate a customer obligation such as a dollar amount owed to the biller. (e.g., $111). The customer may insert an exact amount owed into the currency processing hardware 132 of the TPS 102.

Upon posting the payment, the XML transaction of FIG. 3A may be generated and communicated to, for example, the back-end server 106. According to the exemplary transaction, the node "Deposit" includes attributes for a transaction date, a transaction reference ID, and a device reference ID that corresponds to an ID associated with the kiosk where the transaction was generated (i.e., MCMCDEALER1). A description child node may include a string description of the transaction such as "111.00 deposited into MCMCDEALER1 for Loan 158970R." One or more child nodes are generated based on the amount of currency inserted into the currency processing hardware 132 of the TPS 102. For example, in this scenario the customer inserted two $10 notes, two $5 notes, four $20 notes, and one $1 note, for a total of $111. Other information that may be specified (but not shown) includes the biller ID (e.g., MCMC) customer account information, amount dispensed, if any, etc.

Upon completion of the transaction, the TPS 102 may generate a printed receipt of the transaction.

The second exemplary transaction of FIG. 3B may be generated under the following scenario: A customer may select a biller to be paid at operation 205. The customer may have previously provided identifying information at operation 210. Service information communicated to the customer after operation 225 may indicate a customer obligation such as a dollar amount owed to the biller. (e.g., $50). The customer may insert, for example, $60 into the currency processing hardware 132 of the TPS 102.

Upon posting the payment, the XML transaction of FIG. 3B may be generated and communicated to, for example, the back-end server 106. In this case, the transaction includes a Withdrawal node with one or more child nodes that indicate amount of change provided to the customer. For example, in this case, the customer received one $10 note in change.

The third exemplary transaction of FIG. 3C may be generated under the following scenario: A customer may select a biller to be paid at operation 205. The customer may have previously provided identifying information at operation 210. Service information communicated to the customer after operation 225 may indicate a customer obligation such as a dollar amount owed to the biller. (e.g., $260). The customer may insert, for example, $300 into the currency processing hardware 132 of the TPS 102.

Upon posting the payment, the XML transaction of FIG. 3B may be generated and communicated to, for example, the back-end server 106. In this case, the Withdrawal node indicates that two $20 notes were provided in change.

Figure 4:
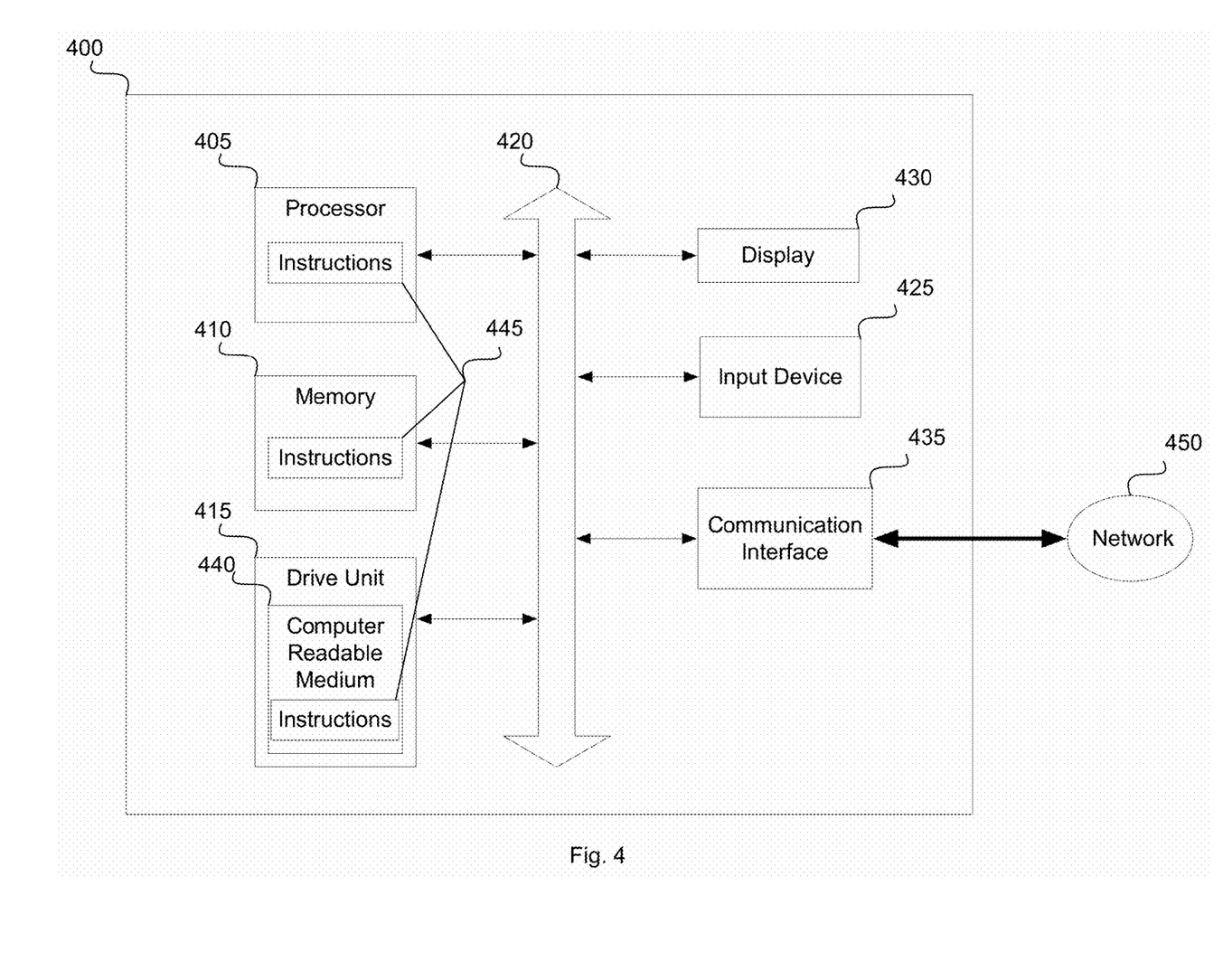
FIG. 4 illustrates an exemplary computer system that may form part of or implement the systems described in the figures or in the following paragraphs.

FIG. 4 illustrates a computer system 400 that may form part of or implement the systems, environments, devices, etc., described above. The computer system 400 may include a set of instructions 445 that the processor 405 may execute to cause the computer system 400 to perform any of the operations described above. The computer system 400 may operate as a stand-alone device or may be connected, e.g., using a network, to other computer systems or peripheral devices.

In a networked deployment, the computer system 400 may operate in the capacity of a server or as a client computer in a server-client network environment, or as a peer computer system in a peer-to-peer (or distributed) environment. The computer system 400 may also be implemented as or incorporated into various devices, such as a personal computer or a mobile device, capable of executing instructions 445 (sequential or otherwise) causing a device to perform one or more actions. Further, each of the systems described may include a collection of subsystems that individually or jointly execute a set, or multiple sets, of instructions to perform one or more computer operations.

The computer system 400 may include one or more memory devices 410 communicatively coupled to a bus 420 for communicating information. In addition, code operable to cause the computer system to perform operations described above may be stored in the memory 410. The memory 410 may be a random-access memory, read-only memory, programmable memory, hard disk drive or any other type of memory or storage device.

The computer system 400 may include a display 430, such as a liquid crystal display (LCD), a cathode ray tube (CRT), or any other display suitable for conveying information. The display 430 may act as an interface for the user to see processing results produced by processor 405.

Additionally, the computer system 400 may include an input device 425, such as a keyboard or mouse or touchscreen, configured to allow a user to interact with components of system 400.

The computer system 400 may also include a disk or optical drive unit 415. The drive unit 415 may include a computer-readable medium 440 in which the instructions 445 may be stored. The instructions 445 may reside completely, or at least partially, within the memory 410 and/or within the processor 405 during execution by the computer system 400. The memory 410 and the processor 405 also may include computer-readable media as discussed above.

The computer system 400 may include a communication interface 435 to support communications via a network 450. The network 450 may include wired networks, wireless networks, or combinations thereof. The communication interface 435 may enable communications via any number of communication standards, such as 802.11, 802.12, 802.20, WiMAX, cellular telephone standards, or other communication standards.

Accordingly, methods and systems described herein may be realized in hardware, software, or a combination of hardware and software. The methods and systems may be realized in a centralized fashion in at least one computer system or in a distributed fashion where different elements are spread across interconnected computer systems. Any kind of computer system or other apparatus adapted for carrying out the methods described herein may be employed.

The methods and systems described herein may also be embedded in a computer program product, which includes all the features enabling the implementation of the operations described herein and which, when loaded in a computer system, is able to carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation and b) reproduction of a first language, code, or notation.

In various real-world scenarios, the techniques and architectures discussed above offer solutions that provide a practical application that is an improvement over existing market solutions. As an example of the provision of a practical application that is an improvement of over existing market solutions, the back-end server 106 may include databases that includes one or more records, where each record may be related to a given account server and/or service provider that owns/operates the account server. Further, as discussed above, the record associated with a service provider may specify the name of the service provider, the IP address for the account server associated with the service provider, capabilities, and requirements associated with the account server. The capabilities field indicates the capabilities of the account server. A server with lookup capabilities may be capable of providing account information, such as a current balance, and amount owed for the current billing cycle, etc. As noted above, a server with blind push capabilities may be unable to provide such information. Accordingly, the database records maintained by the system allow the back-end server to implement the full hardware capabilities that can be supported by the servers with which it communicates. Accordingly, the inclusion of these database records improves the operation of the underlying hardware. Further, the system improves user experience by allowing the back-end server to more quickly and reliably access information to aid in the execution of interactions facilitated by the back-end server.

As example of the provision of a practical application that is an improvement over existing market solutions, the TPS 102 (discussed above) may dynamically generate an interface based on the requirements for authenticating with the account server 104. As an illustrative example, the TPS 102 may display an interface with input fields for providing the requirements. The interface may display an instruction such as "Please enter two or more of the following items." The user may then specify as many required items as needed. The specified items may then be communicated to the back-end server. Accordingly, the TPS dynamically generates an interface for which the system provides a specific manner of displaying a limited set of information to the user, rather than using conventional user interface methods to display generic information.

Moreover, the dynamically generated interface of the TPS 102 proceeds contrary to the conventional wisdom, rather than limiting the user to the necessary number of inputs for authentication, the TPS may invite the user to input the necessary number or more. The conventional wisdom may hold that this may induce the user to input more information that necessary in some cases thereby increasing inefficiency and/or unnecessarily increase the labor of unwary users. However, contrary to conventional wisdom, the invitation to invite the user to input the necessary number or more, may reduce user frustration and effort if their confidence in one or more of the authentication inputs is less than 100%. If the user has provided more than the minimum number of inputs, an error may not necessarily cause a failed authentication, if the minimum can be met by the other inputs. Thus, the inclusion of this interface feature may improve user experience by reducing failed authentication attempts thereby providing practical application that is an improvement over existing market solutions.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

We claim:

1. A kiosk having a terminal for processing transactions comprising:
   a user interface configured to convey information to a user and to receive user commands;
   currency processing hardware configured to receive currency from the user at the kiosk and to determine a type and amount of currency accepted;
   currency processing hardware configured to provide currency from the kiosk and to determine the amount of currency provided;
   a processor in communication with the user interface and the currency processing hardware; and
   non-transitory computer readable media in communication with the processor that stores instruction code which, when executed by the processor, causes the processor to:
   receive, via the user interface, an account category selection;
   communicate the account category selection to a back-end server;
   receive, from the back-end server, a listing of one or more service providers associated with the account category selection;
   convey on the user interface the listing of one or more service providers;
   receive, via the user interface, a service provider selection;
   communicate the service provider selection to the back-end server;
   receive, from the back-end server, authentication requirements associated with the service provider selection;
   determine a minimum number of authentication inputs that meet the authentication requirements;
   convey on the user interface controls that facilitate specification of the authentication requirements by the user by dynamically generating a user interface control that includes an option to provide more than the minimum number of authentication inputs;
   receive, via the user interface, a user-provided authentication input from the user associated with the service provider selection;
   communicate the user provided authentication input from the user associated with the service provider selection to the back-end server;
   receive, from the back-end server, acknowledgment of match of user-provided authentication input from the user with authentication associated with the user for the service provider selection; receive from the back-end server, after user-provided authentication input, an amount of currency to be paid corresponding to the service provider selection;
   display, via the user interface, an indication of an amount of currency to be paid;
   receive currency via the currency processing hardware;
   determine the amount of currency received by the currency processing hardware;
   communicate to the back-end server, the amount of currency received;
   determine whether the amount of currency received via the currency processing hardware is in excess of the amount of currency to be paid corresponding to the service provider selection;

enable the currency processing hardware to provide currency at the kiosk in an amount that is the excess of the amount of currency received as compared to the amount to be paid corresponding to the service provider selection; and after receipt of user-provided authentication input with the service provider selection, generate transaction information processed by the processor, including transaction date, transaction reference identification, and kiosk identification.

2. The kiosk according to claim 1, wherein the kiosk includes a printer in communication with the processor and operable to print a receipt, current balance, or other transaction information.

3. The kiosk according to claim 1, wherein the processor periodically communicates transaction information indicative of transactions processed by the processor to the back-end server of a financial service provider.

4. The kiosk according to claim 1, wherein the authentication requirements correspond to one or more of: a name, zip code, and social security number associated with the user having an account with the selected servicer provider.

5. A method for processing a transaction by a kiosk comprising:

receiving, at a kiosk terminal and from a user, a selection of a service provider;

receiving at the kiosk authentication credential requirements associated with the selected service provider that facilitate authentication of the user by the service provider;

determining a minimum number of authentication inputs that meet the authentication requirements;

dynamically generating a user interface control that includes an option to provide more than the minimum number of authentication inputs;

responsive to input received via the user interface control, communicating, from the kiosk to the service provider account server, authentication credentials associated with the user that satisfy the authentication credential requirements;

receiving at the kiosk and from the service provider account server confirmation that the user has been authenticated based on the communication of the authentication credentials associated with the user, and when the user is authenticated, receiving at the kiosk, from the service provider account server, information indicative of an amount owed on an account with the service provider that is associated with the user;

receiving, via currency processing hardware of the kiosk, currency;

determining a value of the currency received by the currency processing hardware;

communicating transaction information from the kiosk to the service provider account server, including the value of currency received by the currency processing hardware of the kiosk to thereby reduce the amount owed on the account;

determining if the value of the currency received is in excess of the amount owed on the account;

providing, via the currency processing hardware of the kiosk, currency when the amount of currency received by the currency processing hardware exceeds the amount owed on the account; and after communicating from the kiosk to the service provider account server the authentication credentials associated with the user, generating transaction information including transaction date, transaction reference identification, and kiosk identification.

6. The method according to claim 5, wherein prior to receiving the selection of the service provider, the method comprises:

receiving, at the kiosk terminal and from the user, a selection of a service provider type; and displaying, on the kiosk terminal, a listing of service providers that belong to the selected service provider type.

7. The method according to claim 5, wherein the service providers correspond to one or more of: utility service providers, loan providers, retail establishment service providers, and government agencies.

8. The method according to claim 5, wherein after receiving from the service provider account server confirmation that the user has been authenticated based on the communication of the authentication credentials associated with the user, enabling a printer to print a receipt with transaction information thereon.

9. The method according to claim 5, further comprising periodically communicating transaction information indicative of transactions processed on the kiosk terminal to a financial service provider.

10. The method according to claim 5, wherein the authentication credential requirements are communicated to the kiosk terminal from a back-end-server at a location different from the kiosk.

11. The method according to claim 5, wherein the authentication requirements correspond to one or more of: a name, zip code, and social security number associated with the user having an account with the selected servicer provider.

12. The method according to claim 5, wherein the currency amount provided, via the currency processing hardware of the kiosk, is at a value that is the difference between the value of the currency received and the value of the amount owed on the account.

13. A non-transitory computer readable medium that includes instruction code for processing a transaction with a service provider account server, the instruction code is executable on a processor of a currency kiosk machine for causing the currency kiosk machine to perform acts comprising:

receiving, from a user, a selection of a service provider;

receiving authentication credential requirements associated with the selected service provider that facilitate authentication of the user by the service provider;

determining a minimum number of authentication inputs that meet the authentication requirements;

dynamically generating a user interface control that includes an option to provide more than the minimum number of authentication inputs;

responsive to input received via the user interface control, communicating, to the service provider account server, authentication credentials associated with the user that satisfy the authentication credential requirements;

when the user is authenticated, or thereafter, receiving from the service provider account server information indicative of an amount owed on an account with the service provider that is associated with the user;

receiving, via currency processing hardware of the currency kiosk machine, currency;

scanning, via currency processing hardware of the currency kiosk machine, currency to determine a value of the currency received;

communicating transaction information to the service provider account server that indicates the amount of currency received by the currency kiosk machine to thereby reduce the amount owed on the account;

when an amount of currency received by the currency kiosk machine exceeds the amount owed on the account, providing currency in an amount that corresponds to the difference between the amount of currency received and the amount owed on the account; and after receiving authentication credential requirements associated with the selected service provider that facilitate authentication of the user by the service provider, generating transaction information including transaction date, transaction reference identification, and kiosk identification.

14. The non-transitory computer readable medium according to claim 13, wherein prior to receiving the selection of the service provider, the instruction code causes the currency kiosk machine to perform acts comprising:

receiving, from the user, a selection of a service provider type; and displaying, on the currency kiosk machine, a listing of service providers that belong to the selected service provider type.

15. The non-transitory computer readable medium according to claim 13, wherein the service providers correspond to one or more of: utility service providers, loan providers, retail establishment service providers, and government agencies.

16. The non-transitory computer readable medium according to claim 13, wherein the currency kiosk machine includes a printer operable for printing a receipt with transaction information.

17. The non-transitory computer readable medium according to claim 13, wherein the instruction code causes the currency kiosk machine to perform acts comprising periodically communicating transaction information indicative of transactions processed by the processor to a financial service provider.

18. The non-transitory computer readable medium according to claim 13, wherein the authentication credential requirements are communicated to the processor from a back-end-server at a location different from the currency kiosk.

19. The non-transitory computer readable medium according to claim 13, wherein the authentication requirements correspond to one or more of: a name, zip code, and social security number associated with the user having an account with the selected servicer provider.

20. The kiosk according to claim 1, where:

the kiosk is in included in a system, the system further including the backend server; and the backend server including:

a server processor; and another non-transitory computer readable media in communication with the server processor that stores another instruction code which, when executed by the server processor, causes the server processor to:

access a capabilities field in a database record for a provider server associated with the service provide selection; and based on a lookup capability determined responsive to the capabilities field, determine whether to provide a lookup request to the provider server.

* * * * *